(12) United States Patent
Wang et al.

(10) Patent No.: US 11,363,066 B2
(45) Date of Patent: Jun. 14, 2022

(54) METHOD AND DEVICE FOR INFORMATION PROCESSING, TEST TERMINAL, TEST PLATFORM AND STORAGE MEDIUM

(71) Applicant: BEIJING XIAOMI MOBILE SOFTWARE CO., LTD., Beijing (CN)

(72) Inventors: Xin Wang, Beijing (CN); Lin Fan, Beijing (CN); Tianfu Ren, Beijing (CN); Shuting Tian, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 123 days.

(21) Appl. No.: 16/688,121

(22) Filed: Nov. 19, 2019

(65) Prior Publication Data

US 2021/0067555 A1     Mar. 4, 2021

(30) Foreign Application Priority Data

Aug. 30, 2019   (CN) .......................... 201910818703.8

(51) Int. Cl.
*G06F 21/62* (2013.01)
*H04L 41/147* (2022.01)
(Continued)

(52) U.S. Cl.
CPC ........ *H04L 63/166* (2013.01); *G06F 21/6254* (2013.01); *H04L 41/147* (2013.01); *H04L 43/50* (2013.01); *H04L 63/04* (2013.01)

(58) Field of Classification Search
CPC .... G06F 21/577; G06F 21/552; G06F 21/554; G06F 21/604; G06F 2221/2111; G06F 2221/034; H04L 63/1433; H04L 63/107
See application file for complete search history.

(56) References Cited

U.S. PATENT DOCUMENTS

| | | | |
|---|---|---|---|
| 2012/0110674 A1* | 5/2012 | Belani | H04W 4/60 726/25 |
| 2013/0227683 A1* | 8/2013 | Bettini | G06F 21/53 726/22 |

(Continued)

FOREIGN PATENT DOCUMENTS

| | | | |
|---|---|---|---|
| CN | 106067879 A | 11/2016 | |
| CN | 106713067 A | 5/2017 | |

(Continued)

OTHER PUBLICATIONS

Supplementary European Search Report in the European application No. 19210328.1, dated Apr. 24, 2020.

(Continued)

*Primary Examiner* — Tae K Kim
(74) *Attorney, Agent, or Firm* — Syncoda LLC; Feng Ma

(57) ABSTRACT

A method for information processing, applied to a test terminal and includes: a test case is executed through a test application run by the test terminal to generate a message to be sent to a server supporting running of the test application; information of the message is acquired; and the information of the message is sent to a test platform, the information of the message being configured for the test platform to analyze a location of the server and obtain a risk detection result about whether the test application has a cross-border transmission risk or not based on whether the location is outside a safe region range or not. A device for information processing, a test terminal, a test platform and a storage medium are also provided.

20 Claims, 7 Drawing Sheets

(51) Int. Cl.
*H04L 43/50* (2022.01)
*H04L 9/40* (2022.01)

(56) References Cited

U.S. PATENT DOCUMENTS

| | | | |
|---|---|---|---|
| 2016/0203320 A1* | 7/2016 | Valceanu | H04W 12/128 726/25 |
| 2017/0127273 A1 | 5/2017 | Kant | |
| 2018/0063181 A1* | 3/2018 | Jones | G06F 21/577 |
| 2018/0063182 A1* | 3/2018 | Jones | G06F 21/6218 |
| 2018/0174213 A1* | 6/2018 | Barday | G06F 21/6245 |
| 2018/0300496 A1* | 10/2018 | Shriver | H04L 63/20 |
| 2018/0365966 A1 | 12/2018 | Hodge | |
| 2019/0050595 A1* | 2/2019 | Barday | G06F 21/6245 |
| 2019/0166148 A1* | 5/2019 | Eskandari | H04L 63/1433 |
| 2019/0171846 A1* | 6/2019 | Conikee | G06F 21/52 |
| 2019/0179799 A1* | 6/2019 | Barday | G06F 15/76 |
| 2019/0182157 A1* | 6/2019 | Barnes | H04L 12/4641 |
| 2020/0134187 A1* | 4/2020 | Rudek | G06F 21/56 |
| 2020/0142809 A1* | 5/2020 | Adibowo | G06F 8/65 |
| 2020/0151351 A1* | 5/2020 | Skourtis | G06N 5/04 |
| 2020/0193057 A1* | 6/2020 | Yu | G06F 21/6245 |
| 2020/0242269 A1* | 7/2020 | Narayanaswamy | G06F 21/552 |
| 2020/0311304 A1* | 10/2020 | Parthasarathy | G06F 11/3006 |
| 2020/0314147 A1* | 10/2020 | Brannon | G06F 21/577 |
| 2020/0342137 A1* | 10/2020 | Barday | G06F 16/128 |
| 2021/0019395 A1* | 1/2021 | Kraus | G06F 21/6245 |
| 2021/0141932 A1* | 5/2021 | Barday | G06F 16/125 |

FOREIGN PATENT DOCUMENTS

| | | |
|---|---|---|
| CN | 106850505 A | 6/2017 |
| CN | 108121914 A | 6/2018 |
| CN | 108401262 A | 8/2018 |
| CN | 109739748 A | 5/2019 |

OTHER PUBLICATIONS

First Office Action of the Chinese application No. 201910818703.8, dated Jul. 1, 2021.
Second Office Action of the Chinese application No. 201910818703.8, dated Dec. 30, 2021.

* cited by examiner

METHOD AND DEVICE FOR INFORMATION PROCESSING, TEST TERMINAL, TEST PLATFORM AND STORAGE MEDIUM

CROSS-REFERENCE TO RELATED APPLICATION

This application claims priority to Chinese patent application No. 201910818703.8 filed on Aug. 30, 2019, the disclosure of which is hereby incorporated by reference in its entirety.

BACKGROUND

Typically, whether cross-border data transmission is generated is detected manually. For example, an application to be tested is manually tried, thereby detecting whether cross-border transmission possibly occurs to the application to be tested during data transmission.

SUMMARY

The present disclosure generally relates to the technical field of terminals, and more specifically, to a method and device for information processing, a test terminal, a test platform and a storage medium.

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

According to a first aspect of embodiments of the present disclosure, a method for information processing is provided, which may be applied to a test terminal and include that:

a test case is executed through a test application run by the test terminal to generate a message to be sent to a server supporting running of the test application;

information of the message is acquired; and the information of the message is sent to a test platform, the information of the message being used for the test platform to analyze a location of the server and obtain a risk detection result about whether the test application has a cross-border transmission risk or not based on whether the location is outside a safe region range or not.

According to a second aspect of the embodiments of the present disclosure, a method for information processing is also provided, which may be applied to a test platform and include that:

information of a message sent by running a test application to execute a test case is received;

the information of the message is analyzed to determine a location of a server supporting running of the test application; and whether the test application has a risk of transmitting data out of a safe region or not when running is determined according to whether the location of the server is within the safe region or not, and a detection result of a transmission risk is obtained.

According to a third aspect of the embodiments of the present disclosure, a device for information processing is provided, which may include:

a processor; and a memory configured to store an instruction executable for the processor, wherein the processor may be configured to:

execute a test case through a test application run by the test terminal to generate a message to be sent to a server supporting running of the test application;

acquire information of the message; and control a communication component to send the information of the message to a test platform, the information of the message being configured for the test platform to analyze a location of the server and obtain a risk detection result about whether the test application has a cross-border transmission risk or not based on whether the location is outside a safe region range or not.

According to a fourth aspect of the embodiments of the present disclosure, a device for information processing is provided, which may include:

a processor; and a memory configured to store an instruction executable for the processor, wherein the processor may be configured to:

control a communication component to receive information of a message sent by running a test application to execute a test case;

analyze the information of the message to determine a location of a server supporting running of the test application; and determine whether the test application has a risk of transmitting data out of a safe region or not when running according to whether the location of the server is within the safe region or not and obtain a detection result of a transmission risk.

According to a fifth aspect of the embodiments of the present disclosure, a non-transitory computer-readable storage medium is provided, in which a computer program has been stored, the computer program being executable by a processor to implement any method applied to a test terminal or implement any method applied to a test platform.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments but not intended to limit the present disclosure. It is also to be understood that term "and/or" used in the present disclosure refers to and includes one or any or all possible combinations of multiple associated items that are listed.

It is to be understood that "first," "second" and similar terms used in the specification and claims of the present application are not to represent any sequence, number or importance but only to distinguish different parts. Likewise, similar terms such as "a/an," "the" and a plural form do not represent a number limit but represent "at least one." Terms like "include" or "comprise" refer to that an element or object appearing before "include" or "comprise" covers an element or object and equivalent thereof listed after "include" or "comprise" and does not exclude another element or object.

In a commonly used approach, whether cross-border data transmission is generated may be detected manually. Manual operation may result in untimely detection, low efficiency, and inaccuracy.

Figure 1:
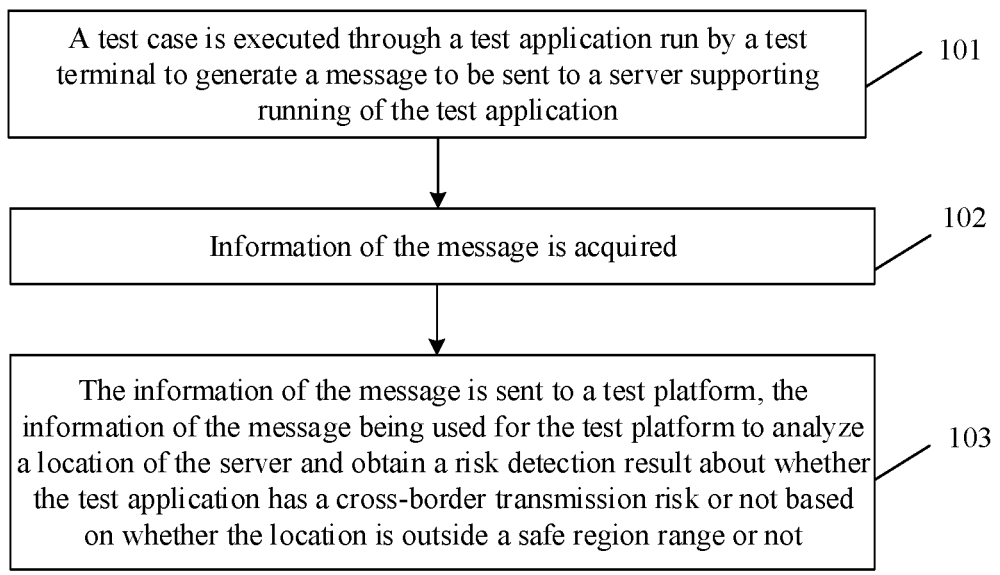
FIG. 1 is a flowchart illustrating a method for information processing according to some embodiments of the present disclosure.

FIG. 1 is a flowchart illustrating a method for information processing according to some embodiments of the present disclosure. As shown in FIG. 1, the method for information processing is applied to a test terminal and may include the following operations.

In operation 101, a test case is executed through a test application run by the test terminal, and a message to be sent to a server supporting running of the test application is generated.

Here, the test terminal may be a mobile terminal, a desktop computer and the like. The mobile terminal may be a mobile phone, a pad, a laptop and the like.

It may be understood that the test application may be an application installed in the test terminal for testing. Specifically, the test terminal may exchange information with the server supporting running of the test application based on the test application.

It may be understood that that the operation that message to be sent to the server supporting running of the test application is generated may include that a request message, for example, a HyperText Transfer Protocol (HTTP) request message, to be sent to the server supporting running of the test application is generated.

In operation 102, information of the message is acquired.

In some embodiments, the information of the message may include, but not limited to, a receiving address of the message, i.e., an address of the server that the message is to be sent to and supports running of the test application.

In some embodiments, the method may further include that:

an acquisition component for the information of the message is installed in a Secure Sockets Layer (SSL) or a network request framework.

The operation that the information of the message is acquired may include that:

at least first message information is acquired from the message through the acquisition component, the first message information at least including a receiving address of the server corresponding to the message.

The SSL may be a secure sockets layer, which is a security protocol for providing security and data integrity for network communication. The SSL encrypts a network connection in a transport layer. Therefore, installing the acquisition component in the SSL may acquire the information of the message.

It may be understood that the network request framework may be a related program code located in an application layer and encapsulated for a network request. At present, there are three network request frameworks: Volley, Okhttp and Retrofit.

It is to be noted that Volley is a network request framework, namely, through Volley, network data such as data in a JSON format may be accessed and a picture may be downloaded. Volley is suitable for network operations involving small data volumes but frequent communication but is not adaptable to network operations with large-scale data. For example, Volley is not adaptable to file downloading. Okhttp is an open source project for processing a network request and may get and post requests, upload and download files, load pictures, support request callback, directly return an object and combination of objects, and support session persistence, etc. Okhttp may allow all requests connected to the same host address to improve request efficiency, may share a Socket to reduce the number of requests to the server, and may also cache response data to reduce repeated network requests and reduce consumption of data traffic. Moreover, Okhttp may automatically process GZip compression. Retrofit is a network request framework encapsulated with Okhttp.

Therefore, installing the acquisition component in the network request framework may also acquire the information of the message.

In the embodiments, the network request framework may be Okhttp or Retrofit.

In some embodiments, the acquisition component may include a program instrumentation part in a program of the SSL or the network request framework.

It may be understood that a basic principle of the program instrumentation is to insert some probes into corresponding parts of the program on the premise of not damaging original logical integrity of the tested program. These probes are substantially code segments for information acquisition, which may be assignment statements or may be function calls for acquiring coverage information. The characteristic data run in the program may be output by executing the probes. An internal activity and characteristic of the program are revealed based on analysis over the characteristic data.

In the embodiments, the probes may be inserted into the program in the SSL or the network request frame to acquire a target program code to be detected. Here, the target program code may be the information of the message.

In the embodiments, the operation that at least the first message information may be acquired from the message through the acquisition component may include that: at least a program code of the first message information may be acquired from a program code of the message through the program instrumentation. Here, the first message information at least may include the receiving address of the server corresponding to the message.

In the embodiments, the receiving address of the server corresponding to the message can be simply acquired through the installed acquisition component, and moreover, it is unlikely to miss any message generated by the test application, and the detection accuracy is improved.

As another example, the information of the message can further include, but not limited to, information of the test application.

Here, the information of the test application may include at least one of a name of the test application, an identifier of the test application, version information of the test application and the like.

It may be understood that an identifier of a test application is unique and may be used for distinguish different test applications.

The operation that the information of the message is acquired further may include that:

second message information is acquired from the information of the message through a content provision application interface, the second message information including information of the test application.

In the embodiments, the information of the test application is acquired, a log file is created according to the acquired information of the test application and according to a correspondence between information of a test application and a receiving address of a corresponding server, and the log file is stored in a memory of the test terminal. For example, the memory in the test terminal may be a Secure Digital (SD) card of the test terminal. Based on the stored log file, a test platform may call the log file of the test terminal to acquire the receiving address of the corresponding server. Therefore, an operation of acquiring the receiving address of the server corresponding to the message can be further simplified.

In operation 103, the information of the message is sent to a test platform; the information of the message is used for the test platform to analyze a location of the server and obtain a risk detection result about whether the test application has a cross-border risk or not based on whether the location is outside a safe region range or not.

Here, in a case that the information of the message may include the receiving address of the server corresponding to the message, the information of the message may be provided for the test platform to analyze the location of the server.

Specifically, the operation that the test platform analyzes the location of the server may include that:

the test platform determines, from the information of the message, the address of the server corresponding to the message according to the information of the message; and the location of the server is analyzed according to the address of the server.

Specifically, the address of the server refers to an Internet Protocol (IP) address of the server. On Internet, an IP address is globally unique. Therefore, the location of the server may be analyzed according to the IP address. For example, a home region of IP address 1 is region A, and a home region of IP address 2 is region B.

In some embodiments, when a home region of an IP address of the test terminal and a home address of the IP address of the server are the same, or, the home region of the IP address of the test terminal and the home region of the IP address of the server are within the same large region range, it may be considered that the location of the server is within a safe region range, otherwise it may be considered that it is outside the safe region range.

That is, the safe region range may be determined according to the home region of the IP address of the test terminal and the home region of the IP address of the server.

In some embodiments, the operation that the information of the message is sent to the test platform may include that:

the information of the message, after being compressed and encrypted, is sent to the test platform.

Here, compressing and encrypting the information of the message may include that: the information of the message is compressed and encrypted directly; or, the information of the message is compressed to form a package containing the information of the message and the package is transmitted through a second transmission protocol instead of a first transmission protocol, the security of the second transmission protocol being higher than that of the first transmission protocol.

Here, the first transmission protocol may be a default plain text transmission protocol of the test terminal, and the second transmission protocol may be a transmission protocol requiring cipher text transmission and/or a transmission protocol requiring identity verification.

For example, the first transmission protocol may be HTTP, and the second transmission protocol may be Hyper Text Transfer Protocol over Secure Socket Layer (HTTPS).

According to the embodiment, transmitting the package containing the information of the message through the second transmission protocol that is securer than the first transmission protocol can ensure data transmission security.

Therefore, in the embodiments, the information of the message may be compressed before being transmitted to reduce a data volume in transmission; and in addition, encryption may further be performed on the information of the message to ensure the transmission security.

The embodiment is applied to a test terminal side. A test case is executed through the test application run by the test terminal to generate a message to be sent to a server supporting running of the test application; information of the message is acquired; and the information of the message is sent to the test platform to automatically analyze the location of the server supporting running of the test application based on the information of the message and obtain a risk detection result about whether the test application has a cross-border transmission risk or not based on whether the location is outside a safe region range or not. Therefore, compared with manual testing, such an automatic cross-border risk testing manner is not influenced by working time of people and has high timeliness, thereby improving the efficiency and accuracy of detection and saving the human cost.

According to the method for information processing in the embodiments of the present disclosure, the location of the server supporting running of the test application may be automatically analyzed based on the information of the message and the risk detection result about whether the test application has the cross-border risk or not may be obtained based on whether the location is outside the safe region range or not. Such an automatic cross-border risk testing manner is free of a constraint from the working time for manual detection, so that detection timeliness is high, detection working efficiency is improved, detection accuracy is increased, and human cost is saved. Moreover, in the automatic cross-border risk testing, an early warning about the cross-border risk may be given to a service provider of the test application or a manufacturer of the test terminal in advance, and a risk that the service provider or the manufacturer violates the General Data Protection Regulation (GDRP) can be reduced.

Figure 2:
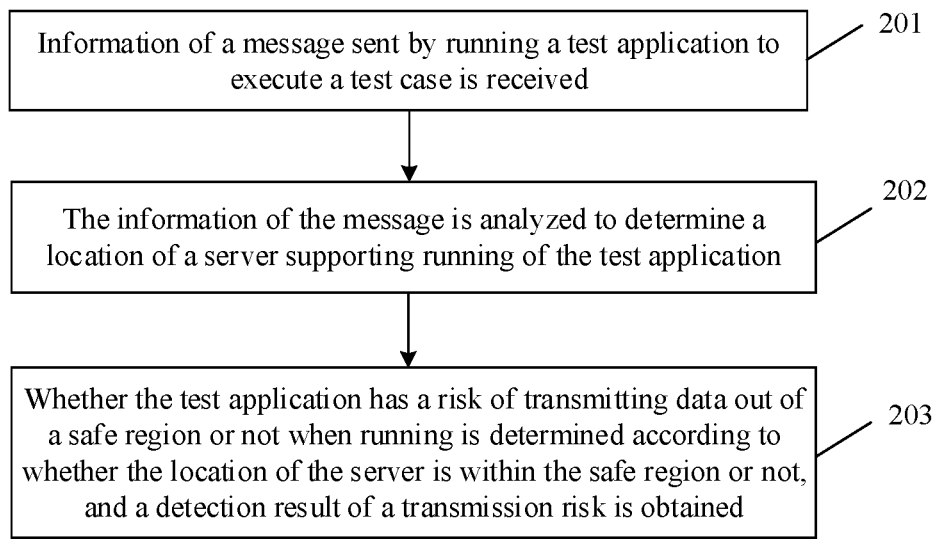
FIG. 2 is a flowchart illustrating a method for information processing according to another exemplary embodiment.

FIG. 2 is a flowchart illustrating a method for information processing according to another exemplary embodiment. As shown in FIG. 2, the method for information processing is applied to a test platform and may include the following operations.

In operation 201, information of a message sent by running a test application to execute a test case is received.

In some embodiments, the operation that the information of the message sent by running the test application to execute the test case is received may include that:

the information of the message sent by running the test application to execute the test case is received from a test terminal.

Here, the test case is executed through the test application run by the test terminal to generate the message to be sent to a server supporting running of the test application, and the information of the message is sent to the test platform.

As another optional embodiment, the operation that the information of the message sent by running the test application to execute the test case is received may include that:

the information of the message sent by running the test application to execute the test case is received from an intermediate device connected with the test terminal.

Here, the intermediate device connected with the test terminal may include: a gateway device connected with the test terminal, or, any other terminal device connected with the test terminal.

In operation 202, the information of the message is analyzed to determine a location of a server supporting running of the test application.

In some embodiments, the operation that the information of the message is analyzed to determine the location of the server supporting running of the test application may include that:

first message information in the information of the message is analyzed to determine the location of the server supporting running of the test application, the first message information including a receiving address of the server corresponding to the message.

Here, in a case that the message is an HTTP request message, the receiving address of the server corresponding to the message may include a request address of the server corresponding to the HTTP request message.

In some embodiments, the receiving address of the server corresponding to the message may be contained in a domain name of the request, and thus the test platform may further determine the receiving address of the server corresponding to the message based on the analysis over the domain name.

Here, the operation that the information of the message is analyzed to determine the location of the server supporting running of the test application may further include that:

the information of the message is analyzed to determine, from the information of the message, the receiving address of the server corresponding to the message; and the location of the server is determined according to the receiving address of the server.

Furthermore, the operation that the location of the server is determined according to the receiving address of the server may include that:

the location of the server corresponding to the receiving address of the server is obtained from a cloud server.

Therefore, when the location of the server corresponding to the receiving address of the server is obtained from the cloud server, the obtained location of the server is more accurate.

In another optional embodiment, the operation that the location of the server is determined according to the receiving address of the server may further include that:

the location of the server corresponding to the receiving address of the server is obtained from a predetermined address library.

Here, the predetermined address library stores a correspondence between a receiving address of a server and a location of the server. For example, a location of home of receiving address A is region A, and a location of home of receiving address B is region B.

In the embodiments, the location of the server corresponding to the receiving address of the server may be rapidly found based on the predetermined address library independently of the network, so that test efficiency is improved.

As another optional embodiment, the operation that the information of the message is analyzed to determine the location of the server supporting running of the test application may include that:

second message information in the information of the message is analyzed to determine the location of the server supporting running of the test application, the second message information including information of the test application.

Here, the second message information in the information of the message is analyzed to determine the location of the server supporting running of the test application according to at least one of a name of the test application, an identifier of the test application, version information of the test application and the like in the second message information.

It is to be noted that, in some embodiments, the second message information has a correspondence with the receiving address of the corresponding server. Here, the operation that the second message information in the information of the message is analyzed to determine the location of the server supporting running of the test application may further include that: the second message information in the information of the message is analyzed to determine the receiving address of the server supporting running of the test application based on the correspondence; and the location of the server is determined according to the receiving address of the server.

It is to be supplemented that, in some embodiments, the correspondence is stored in a memory of the test terminal in form of a log file. Here, the memory of the test terminal may include an SD card of the test terminal.

In operation 203, whether the test application in running has a risk of transmitting data out of a safe region or not is determined according to whether the location of the server is within the safe region or not, and a detection result of the transmission risk is obtained.

Here, the safe region may be understood as a region where cross-border data transmission is allowed. For example, all regions in a home country are allowed safe regions.

The embodiment is applied to a test platform. The test platform analyzes information of a message sent by execution of a test case through a test application to determine a location of a server supporting running of the test application, determines whether the test application in running has a risk of transmitting data out of a safe region or not based on whether the location of the server is within the safe region or not, and obtains a detection result of the transmission risk. Therefore, compared with manual testing in the related art, such an automatic cross-border risk testing manner is not influenced by working time of people and thus has high timeliness, thereby improving efficiency and accuracy of detection and saving human cost.

In some embodiments, the method further may include that:

an association relationship between a detection result of a transmission risk and an identifier of a test application is established.

In the embodiments, establishing the association relationship between a detection result of a transmission risk and an identifier of a test application may facilitate subsequent direct output of the detection result of the transmission risk based on the identifier of the test application without a second test.

In some embodiments, the method further may include that:

the association relationship between the detection result of the transmission risk and the identifier of the test application is output.

Here, the test platform is provided with a display screen. In the embodiments, the operation that the association relationship between the detection result of the transmission risk and the identifier of the test application is output may include that: the association relationship between the detection result of the transmission risk and the identifier of the test application is displayed on the display screen. Therefore, the detection result of the transmission risk of each test application may be viewed more clearly, and an early warning can be given to a developer of the test application.

In some embodiments, the method further may include that:

an input operation over foreground of the test platform is detected; and the association relationship is added into a transmission risk detection library based on the input operation.

Here, the foreground of the test platform may include an interface of the display screen of the test platform, and the display screen of the test platform may be a touch screen.

The operation that the input operation over the foreground of the test platform is detected may include that: a touch operation, for example, a click operation or a swipe operation, over the display screen of the test platform is detected.

Here, the association relationship may be added into the transmission risk detection library based on the input operation such that the risk detection result obtained through the test application may be subsequently called conveniently to acquire the risk detection result.

Furthermore, the present disclosure also provides a specific embodiment which may help further understand the method for information processing provided in the embodiments of the present disclosure.

This embodiment provides a solution of recognizing a cross-border data transmission activity from HTTP message information. Message information in request information of each application is collected from a test terminal, the message information is uploaded to a recognition server, and the recognition server analyzes the uploaded message information to obtain a domain name of a request server from the request information of each application and determines whether the request server is in a legal country or legal region or not through an IP address analyzed from the domain name.

Here, each application may be understood as the test application in the abovementioned embodiment; the request information may be understood as the message sent to the server supporting running of the test application in the abovementioned embodiment; the HTTP message information may be understood as the information of the message in the abovementioned embodiment; and the IP address may be understood as the receiving address of the server corresponding to the message in the abovementioned embodiment.

Here, the operation that the message information in the request information of each application is collected from the test terminal may include that: a BoringSSL code in a system of the test terminal is modified to output a message related to an HTTP/HTTPS request; or, a network request framework (Apache-HTTP/OkHttp/Volley) code is modified to perform instrumentation on related information of an HTTP Uniform Resource Locator (URL) request to acquire the message information in the request information of each application.

Here, it may be understood that instrumentation is implemented by the acquisition component in the abovementioned embodiment; modification of the BoringSSL code in the system of the test terminal may be understood as installation of the acquisition component in the SSL layer in the abovementioned embodiment; and modification of the network request framework (Apache-HTTP/OkHttp/Volley) code may be understood as installation of the acquisition component into the network request framework in the abovementioned embodiment.

Furthermore, a content provision interface ContentProviderAPI provided by a system application security center is called in a cross-process manner to store the related message information of the request into an SD card of a mobile phone, and a log file of which a directory is sdcard/MIUI/debug_log/com.miui.privacy/privacy/ and of which a file content format is a JSON array format is created according to names of different applications.

It is to be noted that the instrumented message information and the stored message information are only used for testing in an internal test platform, without outcome of illegal collection and leakage of user information.

Furthermore, file data of the message information stored in the SD card is packed into a Zip package, and then an encrypted HTTPS request is transmitted to the recognition server through the security center.

Here, transmission of the encrypted HTTPS request to the recognition server through the security center may be understood as transmission of the file data of the message information through the second transmission protocol instead of the first transmission protocol, the security of the second transmission protocol being higher than that of the first transmission protocol, in the abovementioned embodiment.

It is to be noted that the transmitted request information is also used for testing in the test platform only, and illegal collection and uploading of user information is not carried out.

Furthermore, the test platform may recognize the collected message information.

Figure 3:
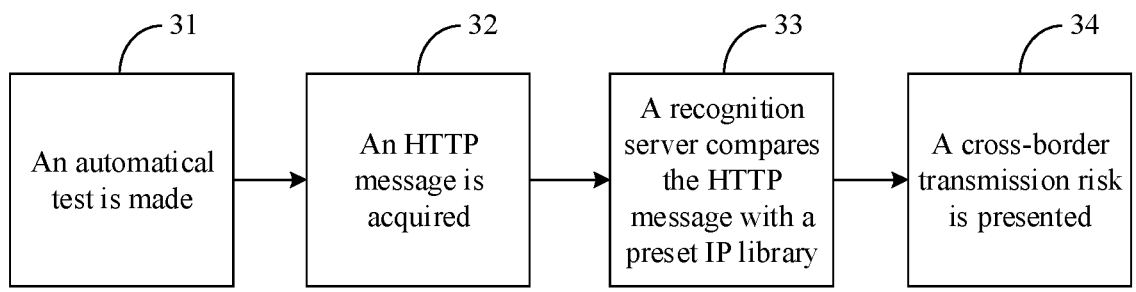
FIG. 3 is a flowchart illustrating a method for information processing according to some embodiments of the present disclosure.

FIG. 3 is a flowchart illustrating a method for information processing according to some embodiments of the present disclosure. As shown in FIG. 3, the method may include the following operations.

In operation 31, an automatic test is made.

Here, an AndroidPackage (APK) of a test application is installed by an open source automation server jenkins of a test platform into a test terminal for the automatic test.

It is to be noted that, in the embodiments, the automatic test may include a Monkey Test. The Monkey Test is automatic test means for Android. The Monkey Test is simple, which just simulates key input, touch screen input and gesture input of a user to test a duration within which a device can keep normal.

In the operation, the test application to be tested is automatically installed through the Monkey Test for the test terminal, and the test application is run to enable the test terminal to automatically run the test application to execute a test case. Therefore, operations of manual installation and running and the like over the application are eliminated, and detection efficiency is improved.

In operation 32, an HTTP message is acquired.

Here, the test terminal acquires message information of the HTTP request message of the Android application and transmits the message information to a recognition server.

Here, the recognition server may substantially be understood as the test platform in the abovementioned embodiment.

The operation that the message information is transmitted to the recognition server may be implemented in a manner that the message information is sent to the test platform after being compressed and encrypted, to improve security of test data.

In operation 33, a recognition server compares a preset IP library.

Here, the recognition server analyzes the message information, compares an analysis result with the preset IP library to determine whether there is an HTTP cross-border request or not and generates and returns a privacy risk result to a front end.

Here, the privacy risk result may be understood as the detection result of the cross-border transmission risk in the abovementioned embodiment. Returning to the front end may be understood as returning to the display screen of the test platform in the abovementioned embodiment. The preset IP library may be understood as the preset address library in the abovementioned embodiment.

Here, a physical address of a home region of each IP address is stored in the preset IP library. For example, a physical address of a home region of IP address 1 is in Beijing China; a physical region of a home region of IP address 2 is in India; and a physical address of a home region of IP address 3 is in Nepal.

The recognition server analyzes the message information to obtain an IP address; when the IP address is IP address 1, it is indicated that the message information sent by the test application does not have any cross-border transmission risk; and when the IP address is IP address 2, it is indicated that the message information sent by the test application has a cross-border transmission risk.

In another embodiment, in a case that the IP address is not in the preset IP library, the IP address may be uploaded to cloud, and whether the physical address of the home region of the IP address has a cross-border transmission risk or not is determined based on a feedback from the cloud.

It is to be noted that, when a home region of an IP address of the test terminal and a home address of the IP address of the server are the same, or, the home region of the IP address of the test terminal and the home region of the IP address of the server are within the same large region range, it may be considered that a location of the server is within a safe region range, otherwise it may be considered that it is outside the safe region range.

Here, in a case that the home region of the IP address of the test terminal is in China, only the test application corresponding to the IP address 1 has no cross-border transmission risk.

In operation 34, a cross-border transmission risk is presented.

Here, a detection result of the cross-border transmission risk of the test application is presented on the display screen of the test platform.

According to the embodiment, not only automatic legal GDPR detection can be implemented, human cost can be saved, accuracy can be improved, but also the problems about detection of a cross-border network transmission risk in legal GDPR detection are also solved. Accordingly, a probability of illegal cross-border transmission of data of an application of a manufacturer is effectively reduced, and a risk that the manufacturer violates privacy compliance related laws is lowered. In addition, working efficiency of engineers is improved and the human cost is saved based on automatic detection from the aspect of making a testing and analysis result of a mobile phone and executing active detection and analysis of privacy by test platform automatically.

Figure 4:
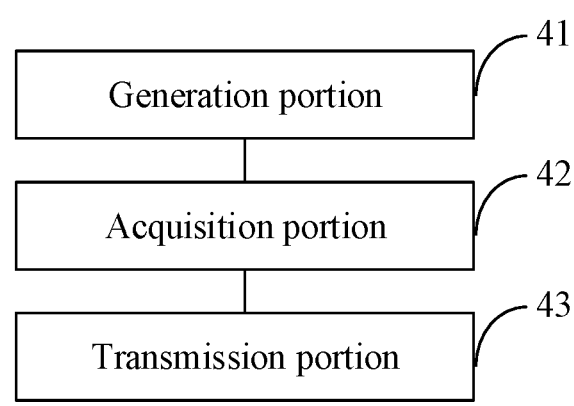
FIG. 4 is a block diagram of a device for information processing according to some embodiments of the present disclosure.

FIG. 4 is a block diagram of a device for information processing according to some embodiments of the present disclosure.

Referring to FIG. 4, the device may include a generation portion 41, an acquisition portion 42 and a transmission portion 43.

The generation portion 41 is configured to execute a test case through a test application run by a test terminal to generate a message to be sent to a server supporting running of the test application.

The acquisition portion 42 is configured to acquire information of the message.

The transmission portion 43 is configured to send the information of the message to a test platform, the information of the message being used for the test platform to analyze a location of the server and obtain a risk detection result about whether the test application has a cross-border transmission risk or not based on whether the location is outside a safe region range or not.

In an optional embodiment, the device further may include:

an installation portion, configured to install an acquisition component for acquiring the information of the message into an SSL or a network request framework.

The acquisition portion 42 is further configured to:

acquire at least first message information from the message through the acquisition component, the first message information at least including a receiving address of the server corresponding to the message.

In an optional embodiment, the acquisition portion 42 is further configured to:

acquire second message information in the information of the message through a content provision application interface, the second message information including information of the test application.

In an optional embodiment, the transmission portion 43 is further configured to:

send the information of the message after being compressed and encrypted to the test platform.

Figure 5:
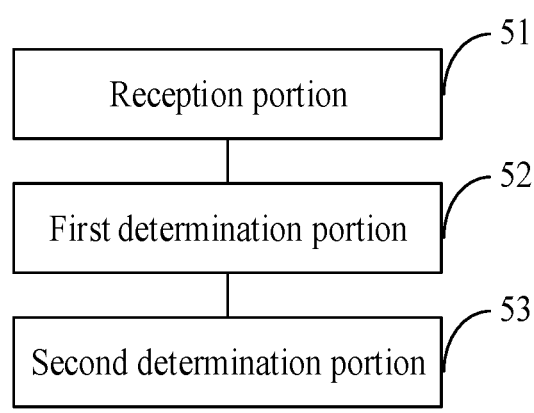
FIG. 5 is a block diagram of a device for information processing according to another exemplary embodiment.

FIG. 5 is a block diagram of a device for information processing according to some embodiments of the present disclosure.

Referring to FIG. 5, the device includes a reception portion 51, a first determination portion 52 and a second determination portion 53.

The reception portion 51 is configured to receive information of a message sent by running a test application to execute a test case.

The first determination portion 52 is configured to analyze the information of the message to determine a location of a server supporting running of the test application.

The second determination portion 53 is configured to determine whether the test application in running has a risk of transmitting data out of a safe region or not according to whether the location of the server is within the safe region or not and obtain a detection result of the transmission risk.

In an optional embodiment, the reception portion 51 is further configured to:

receive the information of the message sent by running the test application to execute the test case from a test terminal or an intermediate device connected with the test terminal.

In an optional embodiment, the first determination portion 52 is further configured to:

analyze first message information in the information of the message to determine the location of the server supporting running of the test application, the first message information at least including a receiving address of the server corresponding to the message.

In an optional embodiment, the first determination portion 53 is further configured to:

analyze second message information in the information of the message to determine the location of the server supporting running of the test application, the second message information including information of the test application.

In an optional embodiment, the device further may include:

an establishment portion, configured to establish an association relationship between a detection result of a transmission risk and an identifier of a test application.

In an optional embodiment, the device further may include:

an output portion, configured to output the association relationship between the detection result of the transmission risk and the identifier of the test application.

In an optional embodiment, the device further may include:

a detection portion, configured to detect an input operation over a foreground of the test platform; and an addition portion, configured to add the association relationship into a transmission risk detection library based on the input operation.

With respect to the device in the above embodiment, the specific manners for performing operations for individual portions therein have been described in detail In the embodiments regarding the method, which will not be elaborated herein.

Figure 6:
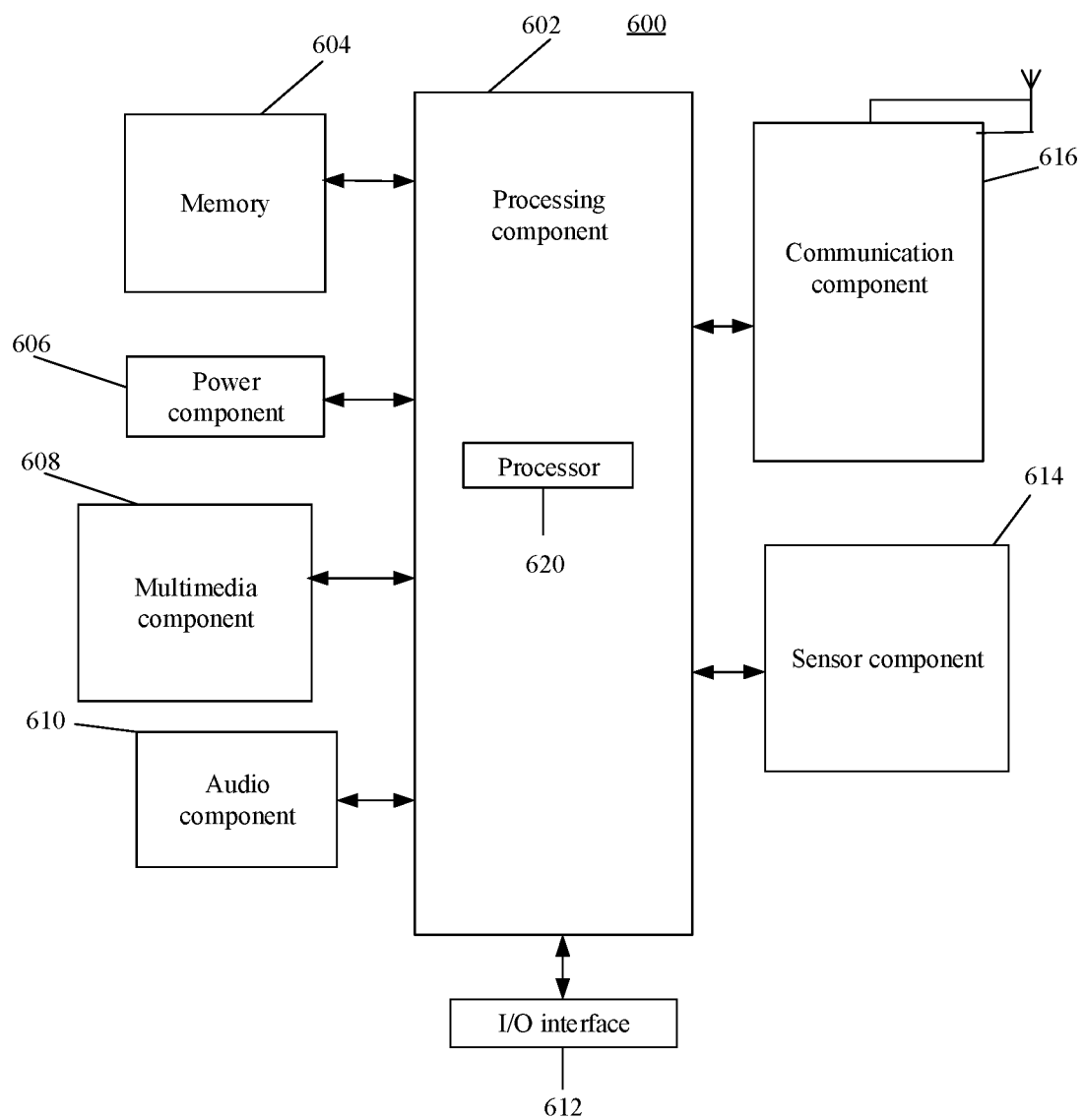
FIG. 6 is a block diagram of a test terminal according to some embodiments of the present disclosure.

FIG. 6 is a block diagram of a test terminal 600 according to some embodiments of the present disclosure. For example, the test terminal 600 may be a mobile phone, a computer, a digital broadcast terminal, a messaging device, a gaming console, a tablet, a medical device, exercise equipment, a personal digital assistant and the like.

Referring to FIG. 6, the test terminal 600 may include one or more of the following components: a processing component 602, a memory 604, a power component 606, a multimedia component 608, an audio component 610, an Input/Output (I/O) interface 612, a sensor component 614, and a communication component 616.

The processing component 602 is typically configured to control overall operations of the test terminal 600, such as the operations associated with display, telephone calls, data communications, camera operations, and recording operations. The processing component 602 may include one or more processors 620 to execute instructions to perform all or part of the operations in the abovementioned method. Moreover, the processing component 602 may include one or more portions which facilitate interaction between the processing component 602 and other components. For instance, the processing component 602 may include a multimedia portion to facilitate interaction between the multimedia component 608 and the processing component 602.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The memory 604 is configured to store various types of data to support the operation of the test terminal 600. Examples of such data include instructions for any applications or methods operated on the test terminal 600, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 is configured to provide power for various components of the test terminal 600. The power component 606 may include a power management system, one or more power supplies, and other components associated with generation, management and distribution of power for the test terminal 600.

The multimedia component 608 may include a screen for providing an output interface between the test terminal 600 and a user. In some embodiments, the screen may include a Liquid Crystal Display (LCD) and a Touch Panel (TP). In some embodiments, organic light-emitting diode (OLED) or other types of displays can be employed. If the screen may include the TP, the screen may be implemented as a touch screen to receive an input signal from the user. The TP may include one or more touch sensors to sense touches, swipes and gestures on the TP. The touch sensors may not only sense a boundary of a touch or swipe action but also detect a duration and pressure associated with the touch or swipe action. In some embodiments, the multimedia component 608 may include a front camera and/or a rear camera. The front camera and/or the rear camera may receive external multimedia data when the test terminal 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 may include a Microphone (MIC), and the MIC is configured to receive an external audio signal when the test terminal 600 is in the operation mode, such as a call mode, a recording mode and a voice recognition mode. The received audio signal may further be stored in the memory 804 or sent through the communication component 616. In some embodiments, the audio component 610 further may include a speaker configured to output the audio signal.

The I/O interface 612 is configured to provide an interface between the processing component 602 and a peripheral interface portion, and the peripheral interface portion may be a keyboard, a click wheel, a button and the like. The button may include, but not limited to: a home button, a volume button, a starting button and a locking button.

The sensor component 614 may include one or more sensors configured to provide status assessment in various aspects for the test terminal 600. For instance, the sensor component 614 may detect an on/off status of the test terminal 600 and relative positioning of components, such as a display and small keyboard of the test terminal 600, and the sensor component 614 may further detect a change in a location of the test terminal 600 or a component of the test terminal 600, presence or absence of contact between the user and the test terminal 600, orientation or acceleration/deceleration of the test terminal 600 and a change in temperature of the test terminal 600. The sensor component 614 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging APP. In some embodiments, the sensor component 614 may also include an acceleration sensor, a gyroscope sensor, a magnetic sensor, a pressure sensor or a temperature sensor.

The communication component 616 is configured to facilitate wired or wireless communication between the test terminal 600 and other equipment. The test terminal 600 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments of the present disclosure, the communication component 616 receives a broadcast signal or broadcast associated information from an external broadcast management system through a broadcast channel. In some embodiments of the present disclosure, the communication component 616 further may include a Near Field Communication (NFC) portion to facilitate short-range communication. For example, the NFC portion may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the test terminal 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 604 including an instruction, and the instruction may be executed by the processor 620 of the test terminal 600 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

A non-transitory computer-readable storage medium can have instructions stored thereon, which executable by a processor of a terminal to enable the terminal to execute the methods of the embodiments described above.

Figure 7:
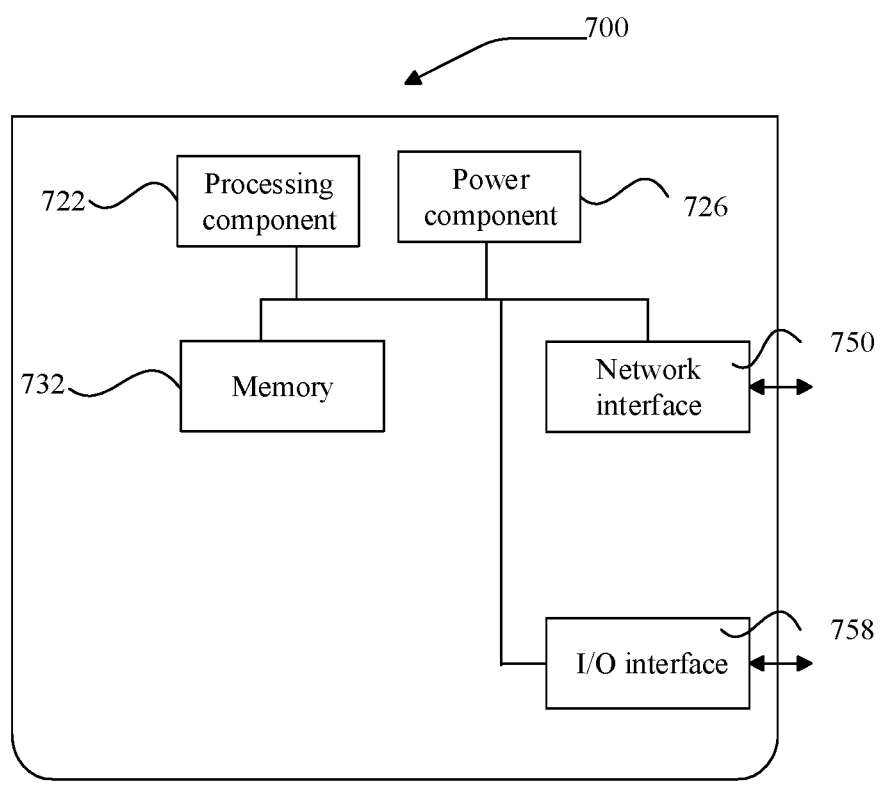
FIG. 7 is a block diagram of a test platform according to some embodiments of the present disclosure.

FIG. 7 is a block diagram of a test platform 700 according to some embodiments of the present disclosure. For example, the test platform 700 may be presented as a server.

Referring to FIG. 7, the test platform 700 includes a processing component 722 which further includes one or more processors, and a memory resource represented by a memory 732 configured to store an instruction executable by the processing component 722, for example, an application. The application stored in the memory 732 may include one or more than one portion of which each corresponds to a set of instructions. In addition, the processing component 722 is configured to execute the instruction to execute the method for information processing applied to the test platform in each method embodiment.

The test platform 700 may further include a power component 726 configured to execute power management of the test platform 700, a wired or wireless network interface 750 configured to connect the test platform 700 to a network and an I/O interface 758. The test platform 700 may be operated based on an operating system stored in the memory 732, for example, Windows Server™, Max OS X™, Unix™, Linux™, FreeBSD™ or the like.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for information processing, applied to a test terminal and comprising:
   executing a test case through a test application run by the test terminal to generate a message to be sent to a server supporting running of the test application;
   acquiring information of the message, wherein the information of the message includes an address of the server;
   sending the information of the message to a test platform to analyze a location of the server and obtain a risk detection result about whether the test application has a cross-border transmission risk, based on whether the location of the server is outside a safe region range; and
   installing an acquisition component for acquiring the information of the message into a Security Sockets Layer (SSL) or a network request framework,
   wherein the acquisition component comprises a program instrumentation, and the program instrumentation is at least one probe inserted into a program of the SSL or the network request framework to acquire the information of the message.

2. The method of claim 1,
   wherein the acquiring the information of the message comprises:
   acquiring at least first message information from the message through the acquisition component, wherein the first message information at least comprises a receiving address of the server corresponding to the message.

3. The method of claim 1, wherein the acquiring the information of the message further comprises:
   acquiring second message information from the information of the message through a content provision application interface,
   wherein the second message information comprises information of the test application.

4. The method of claim 1, wherein the sending the information of the message to the test platform comprises:
   sending the information of the message after being compressed and encrypted to the test platform.

5. A method for information processing, applied to a test platform and comprising:
   receiving information of a message sent by running a test application to execute a test case;
   analyzing the information of the message to determine a location of a server supporting running of the test application, wherein the information of the message includes an address of the server;
   determining whether the test application in running has a risk of transmitting data out of a safe region according to whether the location of the server is within the safe region; and
   obtaining a detection result of a transmission risk,
   wherein the information of the message is acquired by an acquisition component installed by a test terminal running the test application into a Security Sockets Layer (SSL) or a network request framework, and
   wherein the acquisition component comprises a program instrumentation, and the program instrumentation is at least one probe inserted into a program of the SSL or the network request framework to acquire the information of the message.

6. The method of claim 5, wherein the receiving the information of the message sent by running the test application to execute the test case comprises:
   receiving, from the test terminal or an intermediate device connected with the test terminal, the information of the message sent by running the test application to execute the test case.

7. The method of claim 5, wherein the analyzing the information of the message to determine the location of the server supporting running of the test application comprises:
   analyzing first message information in the information of the message to determine the location of the server supporting running of the test application,
   wherein the first message information at least comprises a receiving address of the server corresponding to the message.

8. The method of claim 5, wherein the analyzing the information of the message to determine the location of the server supporting running of the test application comprises:
   analyzing second message information in the information of the message to determine the location of the server supporting running of the test application,
   wherein the second message information comprises information of the test application.

9. The method of claim 5, further comprising:
   establishing an association relationship between the detection result of the transmission risk and an identifier of the test application.

10. The method of claim 9, further comprising:
    outputting the association relationship between the detection result of the transmission risk and the identifier of the test application.

11. The method of claim 9, further comprising:
    detecting an input operation over a foreground of the test platform; and
    adding the association relationship between the detection result of the transmission risk and the identifier of the test application into a transmission risk detection library based on the input operation.

12. A device for information processing, comprising:
    a processor; and
    a memory configured to store an instruction executable by the processor,
    wherein the processor is configured to:
    execute a test case through a test application run by the device to generate a message to be sent to a server supporting running of the test application;

acquire information of the message, wherein the information of the message includes an address of the server; and control a communication component to send the information of the message to a test platform, wherein the information of the message is for the test platform to analyze a location of the server and obtain a risk detection result about whether the test application has a cross-border transmission risk, based on whether the location of the server is outside a safe region range, wherein the processor is further configured to install an acquisition component for acquiring the information of the message into a Security Sockets Layer (SSL) or a network request framework, and wherein the acquisition component comprises a program instrumentation, and the program instrumentation is at least one probe inserted into a program of the SSL or the network request framework to acquire the information of the message.

13. The device of claim 12, wherein the processor is further configured to:

acquire at least first message information from the message through the acquisition component, wherein the first message information at least comprises a receiving address of the server corresponding to the message.

14. The device of claim 13, wherein the processor is further configured to:

acquire second message information from the information of the message through a content provision application interface, wherein the second message information comprises information of the test application.

15. A device for information processing, comprising:
a processor; and
a memory configured to store an instruction executable by the processor,
wherein the processor is configured to:
control a communication component to receive information of a message sent by running a test application to execute a test case;
analyze the information of the message to determine a location of a server supporting running of the test application, wherein the information of the message includes an address of the server; and
determine whether the test application in running has a risk of transmitting data out of a safe region according to whether the location of the server is within the safe region, and obtain a detection result of a transmission risk, wherein the information of the message is acquired by an acquisition component installed by a test terminal running the test application into a Security Sockets Layer (SSL) or a network request framework, and wherein the acquisition component comprises a program instrumentation, and the program instrumentation is at least one probe inserted into a program of the SSL or the network request framework to acquire the information of the message.

16. The device of claim 15, wherein the processor is further configured to:

control the communication component to receive, from the test terminal or an intermediate device connected with the test terminal, the information of the message sent by running the test application to execute the test case.

17. The device of claim 15, wherein the processor is further configured to:

analyze first message information in the information of the message to determine the location of the server supporting running of the test application, wherein the first message information at least comprises a receiving address of the server corresponding to the message.

18. The device of claim 17, wherein the processor is further configured to:

analyze second message information in the information of the message to determine the location of the server supporting running of the test application, wherein the second message information comprises information of the test application.

19. A non-transitory computer-readable storage medium having instructions stored thereon for execution by a processor of a terminal to enable the terminal to implement the operations of the method of claim 1.

20. A test system implementing the method according to claim 1, comprising the test terminal and the test platform, wherein the test platform is configured to automatically analyze the location of the server and automatically obtain the risk detection result; wherein the test system is configured to provide an early warning about the cross-border risk to a service provider of the test application or a manufacturer of the test terminal concerning a risk of the service provider or the manufacturer violating the General Data Protection Regulation (GDRP).

* * * * *